(12) United States Patent
Lyons et al.

(10) Patent No.: US 10,949,889 B2
(45) Date of Patent: Mar. 16, 2021

(54) METHODS AND APPARATUS FOR MANAGING MODELS FOR CLASSIFICATION OF ONLINE USERS

(71) Applicant: The Nielsen Company (US), LLC, New York, NY (US)

(72) Inventors: Kevin Charles Lyons, New York, NY (US); Elad Efraim, New York, NY (US); Matthew Fornari, New York, NY (US); Devin Jones, New York, NY (US); Alon Kaftan, Rosh Ha'Ayin (IL)

(73) Assignee: EXELATE MEDIA LTD., Rosh Ha'ayin (IL)

( * ) Notice: Subject to any disclaimer, the term of this patent is extended or adjusted under 35 U.S.C. 154(b) by 799 days.

(21) Appl. No.: 15/212,183

(22) Filed: Jul. 15, 2016

(65) Prior Publication Data
US 2017/0193558 A1    Jul. 6, 2017

Related U.S. Application Data

(60) Provisional application No. 62/274,762, filed on Jan. 4, 2016.

(51) Int. Cl.
*G06Q 30/02* (2012.01)
*G06N 20/00* (2019.01)

(52) U.S. Cl.
CPC ......... *G06Q 30/0269* (2013.01); *G06N 20/00* (2019.01); *G06Q 30/0201* (2013.01); *G06Q 30/0277* (2013.01)

(58) Field of Classification Search
CPC combination set(s) only.
See application file for complete search history.

(56) References Cited

U.S. PATENT DOCUMENTS 8,504,411 B1 * 8/2013 Subasic .............. G06Q 30/0201
    705/7.33
8,886,575 B1 * 11/2014 Liu .................... G06Q 30/0201
    706/12

(Continued)

OTHER PUBLICATIONS

Wasikowski, Combating the Class Imbalance Problem in Small Sample Data Sets, 2009, Submitted to the Department of Electrical Engineering & Computer Science and the Graduate Faculty of the University of Kansas School of Engineering (Year: 2009).*

(Continued)

*Primary Examiner* — Marie P Brady
(74) *Attorney, Agent, or Firm* — Hanley, Flight & Zimmerman, LLC

(57) ABSTRACT

Methods and apparatus for managing models for classification of online users are disclosed. An example method includes determining a segment associated with a received impression, determining whether the received impression includes an indication that the received impression is the result of a conversion associated with the segment, determining a current ratio of converted to non-converted impressions associated with a classification model associated with the segment, determining a difference between the current ratio and a target ratio, and storing an indication of the received impression for use in at least one of training or updating a classification model associated with the segment when: (a) the difference does not meet a threshold or (b) counting the received impression in the ratio would reduce the difference.

20 Claims, 8 Drawing Sheets

(56) References Cited

U.S. PATENT DOCUMENTS

| | | | |
|---|---|---|---|
| 10,339,468 B1* | 7/2019 | Johnston | G06N 5/04 |
| 2004/0103017 A1* | 5/2004 | Reed | G06Q 30/02 |
| | | | 705/7.31 |
| 2004/0205482 A1* | 10/2004 | Basu | G11B 27/28 |
| | | | 715/201 |
| 2010/0005000 A1* | 1/2010 | McKinzie | G06Q 30/02 |
| | | | 705/14.73 |
| 2011/0320767 A1* | 12/2011 | Eren | G06N 20/00 |
| | | | 712/30 |
| 2013/0085837 A1* | 4/2013 | Blume | G06Q 30/0241 |
| | | | 705/14.41 |
| 2014/0143019 A1 | 5/2014 | Lyons et al. | |
| 2017/0132516 A1* | 5/2017 | Zhang | G06Q 30/0202 |

OTHER PUBLICATIONS

Tsuruoka et al., "Stochastic Gradient Descent Training for L1-regularized Log-linear Models with Cunulative Penalty," Proceedings of the 47th Annual Meeting of the ACL and the 4th IJCNLP of the AFNLP, pp. 477-485, Suntec, Singapore, Aug. 2-7, 2009, 9 pages.

* cited by examiner

METHODS AND APPARATUS FOR MANAGING MODELS FOR CLASSIFICATION OF ONLINE USERS

RELATED APPLICATIONS

This patent claims the benefit of U.S. Provisional Patent Application No. 62/274,762, filed Jan. 4, 2016. U.S. Provisional Patent Application No. 62/274,762 is incorporated herein by reference in its entirety.

FIELD OF THE DISCLOSURE

This disclosure relates generally to online user classification, and, more particularly, methods and apparatus for managing models for classification of online users.

BACKGROUND

Advertisement targeting and data collection techniques provide advertisers and other marketing organizations with market segment data related to advertising viewers, including, for example, computer users who view advertising on the World Wide Web (Web) or Internet. For advertising viewers such as Internet users, the available information related to each user depends, for example, on his or her historical Web behavior and, for example, on his or her origin environment, such as the user's computing platform, service provider, country, time of day, etc. A "market segment" or "segment" is a subset, or partial portion of a group that can be characterized in some way. A segment object is a data object describing such a group. For example, users who have/might have an interest in luxury cars may belong to the "luxury cars" segment for which data is stored in a "luxury cars" segment object.

Advertisers and other marketing organizations may create segment definitions to define groups of potential marketing targets (e.g., users) and direct advertising to those groups, such as groups of users on the Internet. "Data publishers" (or "data sellers") may sell or otherwise distribute information concerning targets or people, such as Internet users, and their behaviors. Advertisers and other marketing organizations (or any other type of entity) may use information about targets of a segment to create, for example, behavioral segment definitions. For example, an Internet user may access a Web site of a data publisher, such as a bicycling interest Web site and be identified as a user "interested in bicycling." Other attributes, such as time and location of the person's access, may also be identified. Data publishers may sell the identifying information about users who access their sites and receive income from sales based on this information's use.

User identification (ID) data from data publishers can be used to create segment definitions. In general, segment definitions may be characterized by specific values for available properties. For example, segment definitions might exist for categories such as "Gender", "Age" and "Nationality." A segment combination might be defined with three properties as, "Male, 35-40, European." Once identified (e.g., from information from a data publisher (data seller)), a user who fits the characteristics of "Male, 35-40, European" can be grouped into and/or associated with this segment combination. An advertisement can be exposed to (or placed) with users identified with the segment combination, and data can be collected to determine how the users identified with that segment respond. For example, behavioral segment definitions for "Shopping Interest", "Running Interest" and "Web surfing interest" can be defined and behavioral attributes, such as "likes to shop", "intensely likes running" or "Web surfs in the evening" can also be included in segment combinations. Segment combinations can have attributes that are purely behavioral, purely non-behavioral or a mixture of behavioral and non-behavioral.

The efficiency of a given advertisement depends on the match between the content of the advertisement (advertising content) and the market segment to which the content is exposed. For example, a numeric "conversion ratio" value may describe the efficiency or "success" relationship between advertising content and target segment. A high conversion ratio value can show, for example, by various measures or various methods of determining or collecting such data, that a given advertisement or advertising campaign (group of advertisements) is well received by a given target segment.

It is perceived within the advertising and marketing industries that, in general, better and more accurate segment targeting capabilities could improve conversion ratios. High conversion ratios for advertisements, on the Internet and in other advertising venues, such as, e.g., print, outdoor, direct are desirable. Identification, for example, of a large user group with a high response rate to advertising and with members who respond in stable and predictable manners over time is desirable.

Within Internet marketing, serving systems for organizations executing advertisement placement in advertising campaigns may execute "media optimization" when placing an advertisement on a particular Web site or with a particular media publisher. Media optimization may include analyzing parameters in segment combinations to identify values for each parameter that may yield the "best results" for each advertisement the serving system runs. A serving system may be a networked computing system that enables an operator to place advertisements on particular Web pages. Serving systems place advertisements on behalf of an advertiser or advertising agency, and can be operated by a number of entities such as an independent operator working with an advertiser or advertising agency.

DETAILED DESCRIPTION

Figure 1:
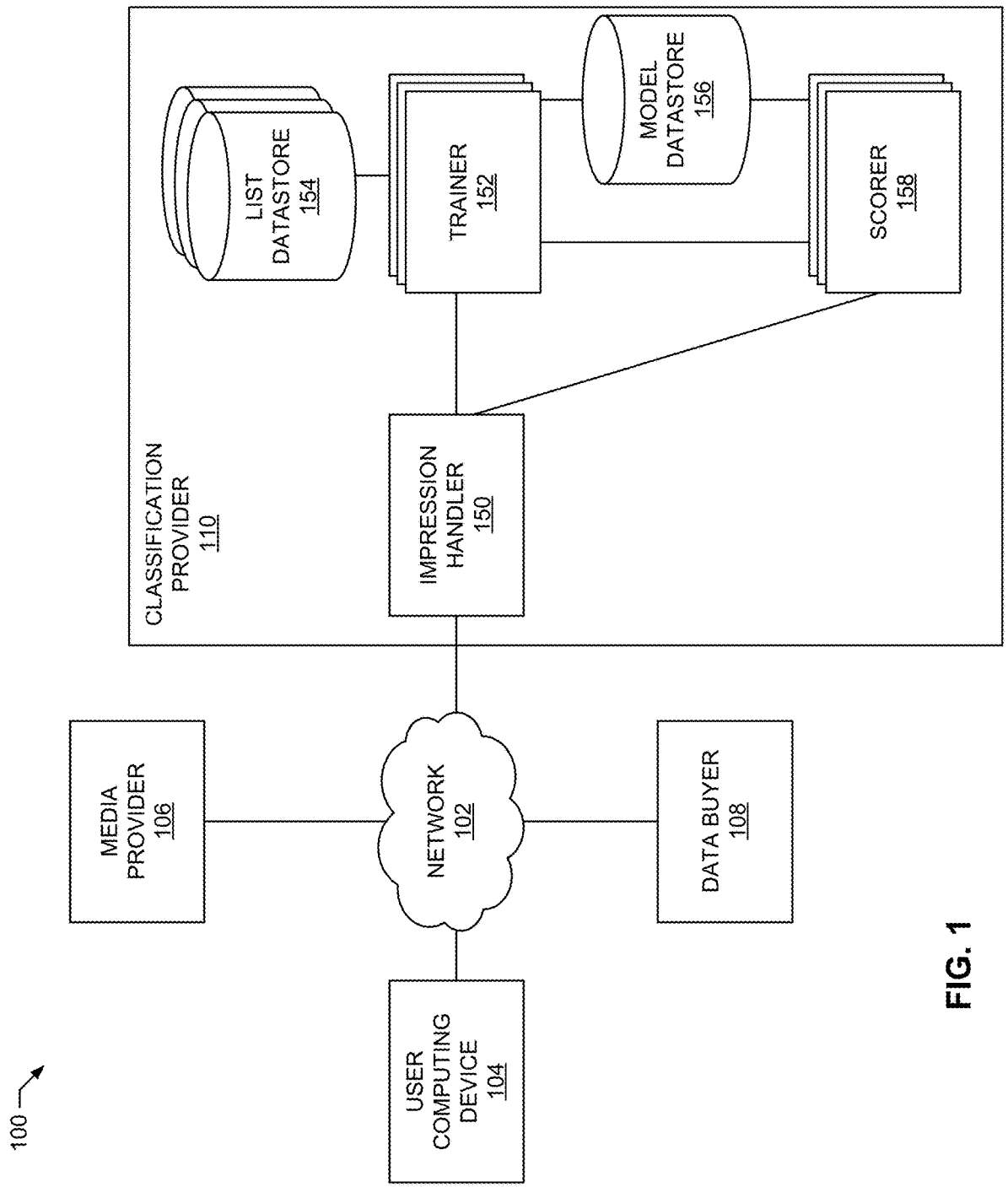
FIG. 1 is a block diagram of an example environment in which an example classification provider operates to train classification models and apply the classification models to received impressions.

With the increased development of Internet advertising markets, information about the people most likely to visit a website and information about the people most likely to purchase a product (e.g., from visiting a website, from a bricks and mortar store, etc.) are increasingly more valuable. To identify a person likely to perform an action, a model(s)

may be used to classify a user based on determined characteristics of the user, prior activity/behavior of the user, or any other available information. A model is a statistical object that is developed from a training set of data in which a set of parameters (e.g., user characteristics, user behaviors, etc.) are associated with a classification result such that parameters from test data can be applied to the model to determine a result indicative of whether the test data meets the classification. In other words, a model for a segment (e.g., the "luxury cars" segment) is trained based on training data in which the user characteristics are known to be associated with a classification (or known not to be associated with the classification). After training, when unclassified user characteristics are applied to the model, a resulting value indicative of whether or not the user having the user characteristics should be classified as in the segment (or not in the segment) is computed. The resulting value can be compared to a threshold. For example, resulting values less than one may indicate that the user is not classified in the segment and user values greater than or equal to one may indicate that the user is classified in the segment.

As compared with deterministic classification in which a user's past behavior determines the classification of the user (e.g., a user that visits a luxury car website is classified in the "luxury car" segment), classification of user's using models enables classification of users for which little past behavior is known and/or for which past behavior does not indicate a segment. For example, using modeled classification, a user that has never visited a luxury car website may, nevertheless, be classified in the "luxury car" segment when the user's characteristics, past behavior, etc. are similar to characteristics, behavior, etc. of other users (in training data) known to be classified in the "luxury car" segment (e.g., because those users have visited a luxury car website and have been deterministically classified in the "luxury car" segment). Thus, using model classification, as compared with deterministic classification, more users can be classified to segments, users with limited or not past activity data can be classified to segments, etc.

The usefulness of a classification model is linked to the accuracy, scale, speed, etc. with which the classification model can predict a classification. In typical model classification systems, classification models are trained prior to deployment and infrequently updated through manual re-training. Methods and apparatus disclosed herein facilitate automatic ongoing training/updating of classification models using training data that is received during operation of a classification system. For example, training data for a model may be received while the model and/or other models are being utilized to classify users. Furthermore, disclosed methods and apparatus facilitate the distribution of classification models throughout a distributed computing system (e.g., computationally and/or geographically distributed throughout a data center, throughout multiple data centers, etc.) that receives user impressions and classifies the users associated with the impressions.

FIG. 1 is a block diagram of an example environment 100 in which the disclosed methods and apparatus may be utilized to perform model classification and perform ongoing training of classification models. The example environment 100 includes an example network 102 communicatively coupling an example user computing device 104, an example media provider 106, an example data buyer 108, and an example classification provider 110. According to the illustrated example and as explained in further detail below, when a user at the example user computing device 104 visits a webpage served by the example media provider 106, instructions on the example webpage cause the user computing device 104 to transmit a notification (e.g., a web request) to the example classification provider 110. The example classification provider 110 receives the notification as an impression and trains a classification model using the impression and/or classifies the impression and, thereby, the user using a classification model. When the impression is classified as belonging to a segment for which the example data buyer 108 has purchased or otherwise requested notification, the example classification provider 110 notifies the example data buyer about the user (e.g., by redirecting the example user computing device 104 to notify the example data buyer that the user is a member of the segment).

The example user computing device 104 is a computing device capable of accessing media served by the example media provider 106 via the example network 102. According to the illustrated example, the user computing device 104 includes a web browser for requesting, downloading, and presenting the media served by the media provider 106. Alternatively, the user computing device 104 may be any other type of device such as, for example, a desktop computer, a laptop computer, a mobile computing device, a television computing device, etc.

The media provider 106 of the illustrated example is a web provider to hosts a web server serving a webpage. The example webpage is instrumented with instructions that, when retrieved and executed by the example user computing device 104, cause the example user computing device 104 to transmit a web request to the example classification provider 110 via the example network 102 to notify the example classification provider 110 that the example user computing device 104 has visited the example webpage. For example, the instructions may be JavaScript instructions that, when executed, cause the example user computing device 104 to transmit a web request that includes a cookie identifier identifying the user computing device 104, a first identifier identifying the example media provider 106, and a second identifier identifying the particular webpage and/or media accessed. Alternatively, the instructions may be any other type of instructions and/or may cause the user computing device 104 to notify the example classification provider 110 in any other manner (e.g., a message, an image request, etc.).

While the example media provider 106 is a web server, the media provider 106 may additionally or alternatively serve any type of media to the user computing device 104 in any manner. For example, the media provider 106 may be a streaming audio service, a streaming video service, a television provider, etc.

The example data buyer 108 is a targeted advertising service that serves online advertisements on webpages. The example data buyer 108 requests and receives information about the classifications performed by the example classification provider 110. According to the illustrated example, the classification information is transmitted from the example classification provider 110 to the example data buyer 108 via the user computing device 104 in some instances and transmitted directly from the example classification provider 110 to the example data buyer 108 in some instances. The example data buyer 108 targets the advertisements to users (e.g., a user of the example user computing device 104 using classification information received from the example classification provider 110). Alternatively, the example data buyer 108 may utilize the classification information in any manner (e.g., to transmit advertisements in any other manner, to perform marketing studies, etc.).

For example, when the user computing device 104 accesses a webpage at the example media provider 106, the example user computing device 104 transmits a notification to the example classification provider 110, which classifies the user computing device 104 (e.g., a user of the example user computing device 104) into a segment for which the data buyer has expressed interest (e.g., paid the classification provider 110 for access to information about users in the segment). In such an example, the data buyer 108 receives a notification that the example user computing device 104 has been classified in the segment (e.g., via a notification transmitted to the example data buyer 108 from the example user computing device 104 in response to an instruction from the example classification provider 110). In response to the notification, the example data buyer 108 serves (or serves are a later time) an advertisement to the example user computing device 104 that is targeted to identified segment (e.g., if the user computing device 104 is classified into the "luxury car" segment, the example data buyer 108 may serve a banner advertisement for a luxury car on a webpage that is visited by the example user computing device (e.g., a webpage served by the example media provider 106 or another media provider)).

While the illustrated example of FIG. 1 includes a single user computing device 104, a single media provider 106, and a single data buyer 108, a classification system will typically include multiple of each linked by one or more networks (e.g., the example network 102). For example, multiple of the user computing devices 104 may access multiple webpages at multiple ones of the media provider 106 and multiple ones of the example data buyer 108 may request and receive the same or a variety of classification information.

The example classification provider 110 receives the requests/notifications from the example user computing device 104 (e.g., directed instructions embedded in a webpage served by the example media provider 106) and classifies the users to generate classification information that is distributed to the example data buyer 108. At the example classification provider 110, the requests/notifications are known as impressions because they often indicate that the example user computing device 104 has accessed a particular media, which is known as an impression of the media in the media measurement and classification industry.

The classification provider 110 of the illustrated example is configured to perform deterministic classification of a user of the example user computing device 104 based on a particular action of the user (e.g., visiting a luxury car webpage) and is also configured to perform model classification of the user (e.g., by evaluating characteristics, past activities, etc. using a model). Alternatively, the classification provider 110 may not perform deterministic classification (e.g., in a situation where deterministic classification is performed by another entity, where a user may self-report some classification information, etc.).

To perform classifications, the example classification provider includes an example impression handler 150, example list datastores 154, example trainers 152, an example model datastore 156, and example scorers 158. The block diagram of FIG. 1 illustrates the classification provider 110 as having a single data center that houses the example impression handler 150, the example model datastore 156, and the example scorers 158. The example data center of the example classification provider 110 also houses the example trainers 152, which are associated with a plurality of the respective list datastores 154. Alternatively, the classification provider may include a plurality of data centers and data may be replicated or synced between the data centers. Additionally or alternatively, some or all of the data centers may include trainers, may only include scorers, and/or scorers and trainers housed in the same hardware (e.g., one or more servers that host trainers and scorers).

The example impression handler 150 receives requests/notifications (impressions) from the example user computing device 104 and, if the impressions are not already labeled for a classification, performs deterministic classification of the impression. For example, the example impression handler 150 is provided with a set of rules that indicate how an impression is to be classified (e.g., impressions associated with a particular media (e.g., a luxury car webpage or from a luxury car media provider) are to be classified in the "luxury car" segment). The example impression handler 150 transmits the impression (e.g., and a label of a deterministic classification) to the example trainers 152 for use in training classification models. The example impression handler 150 additionally transmits impressions to the example scorers 158 (e.g., each impression is transmitted to one of the plurality of scorers 158 based on a selection algorithm) for analysis using the already trained classification models to determine if the user associated with the impression should be classified to a new segment. When the example scorers 158 indicate that the user is to be classified to a new segment, the example impression handler 150 notifies the example data buyer 108 via the network 102 (e.g., when the example data buyer 108 has purchased or otherwise requested access to users that belong to the segment).

The example trainers 152 of the illustrated example receive impressions from the example impression handler 150, determine if the impressions are to be used in model training, and perform classification model training using the received impressions. The example trainers 152 employ stochastic gradient descent to train and update classification models because the stochastic gradient descent approach facilitates updating a trained model without the need to re-train on the entire training set of data (e.g., to perform on-the-fly updates of the classification model). The example classification models comprise vectors of parameters corresponding to the impression training information. The classification model is trained by identifying a substantially optimal set of vector weights. For example, the stochastic gradient descent training may be applied to a support vector machine classification model, a logistic regression classification model, etc. Additionally or alternatively, any other model training algorithm that allows a classification model to be updated with additional training data may be used such as, for example, L1 regularization, L2 regularization, perceptron, etc. The example trainers 152 retrieve and store classification models in the example model datastore 156.

To curate the impressions used for training the classification models and validating the trained classification models, the example trainers 152 analyze characteristics of the impressions to balance the training data. When an impression is determined to be used for training a particular model, the example trainers 152 store the impression in the example list datastores 154 to await collection of a threshold amount of training data or a threshold age for the training data before performing a training/updating. For example, the trainers 152 of the illustrated example track a number of impressions received from a particular user (e.g., a particular one of the user computing device 104), a ratio of converted impressions to non-converted impressions, and a ratio of impressions used for training to impressions utilized for performing validation. Based on the number of impressions for the user and the ratios, the example trainers 152 determine whether an impression will be discarded, used for training, or used for performing validation of a model. When the example trainers 152 determine that an impression will be used for training, the impression is stored in the example list datastores 154 (e.g., the information for the impression may be stored in the training list, an indication of the impression may be stored in the training list, etc.). When the example trainers 152 determine that the impression will be used for validation, the impression is transmitted to the example scorers 158 (e.g., to one of the example scorers 158) and the results of the scoring are compared with a known label (e.g., an impression that is already labeled for the "luxury car" segment is scored using a model for the "luxury car" segment and the score is compared with a threshold to determine if the model correctly indicated that the impression is associated with the segment).

Figure 2:
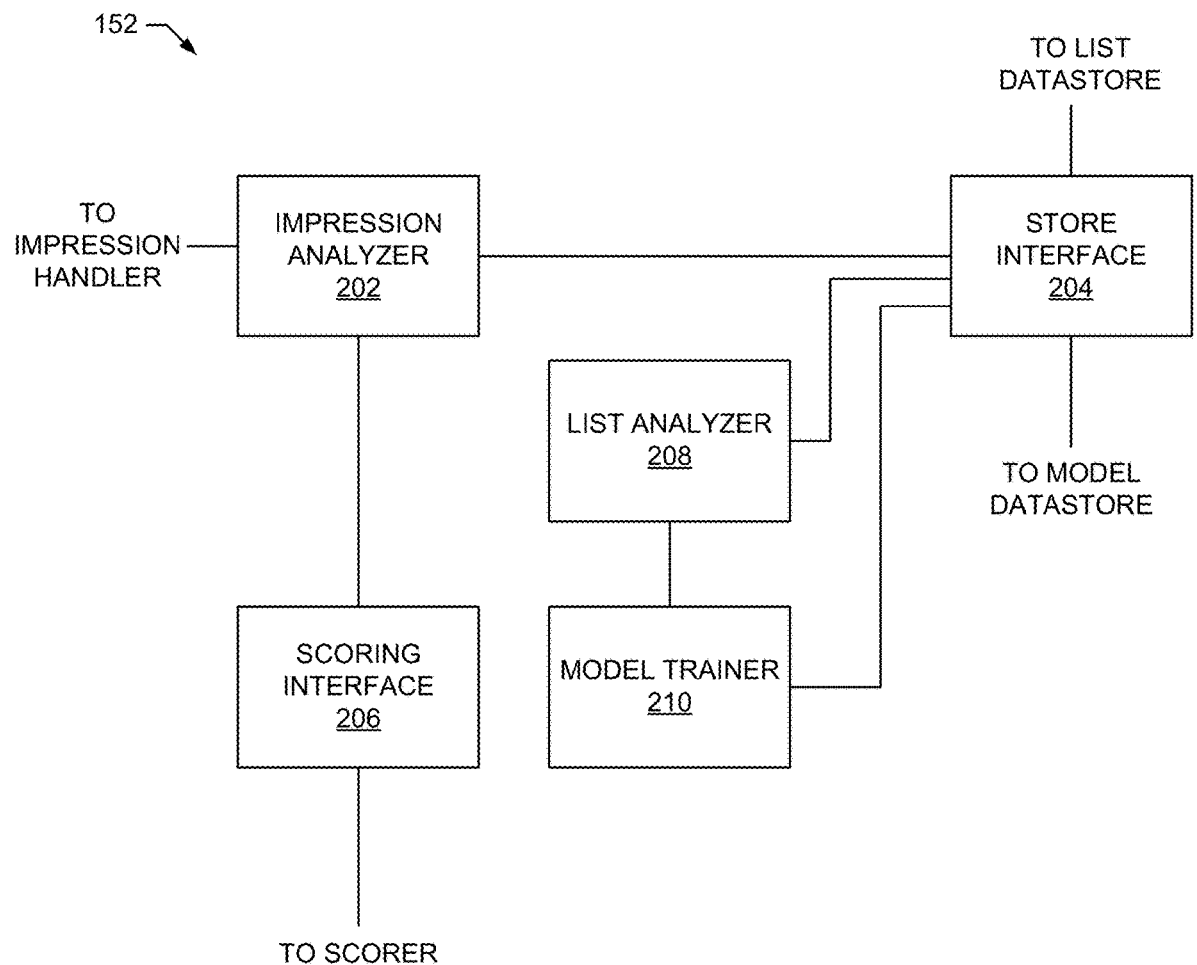
FIG. 2 is a block diagram of an example implementation of the trainer of FIG. 1.
Figure 4:
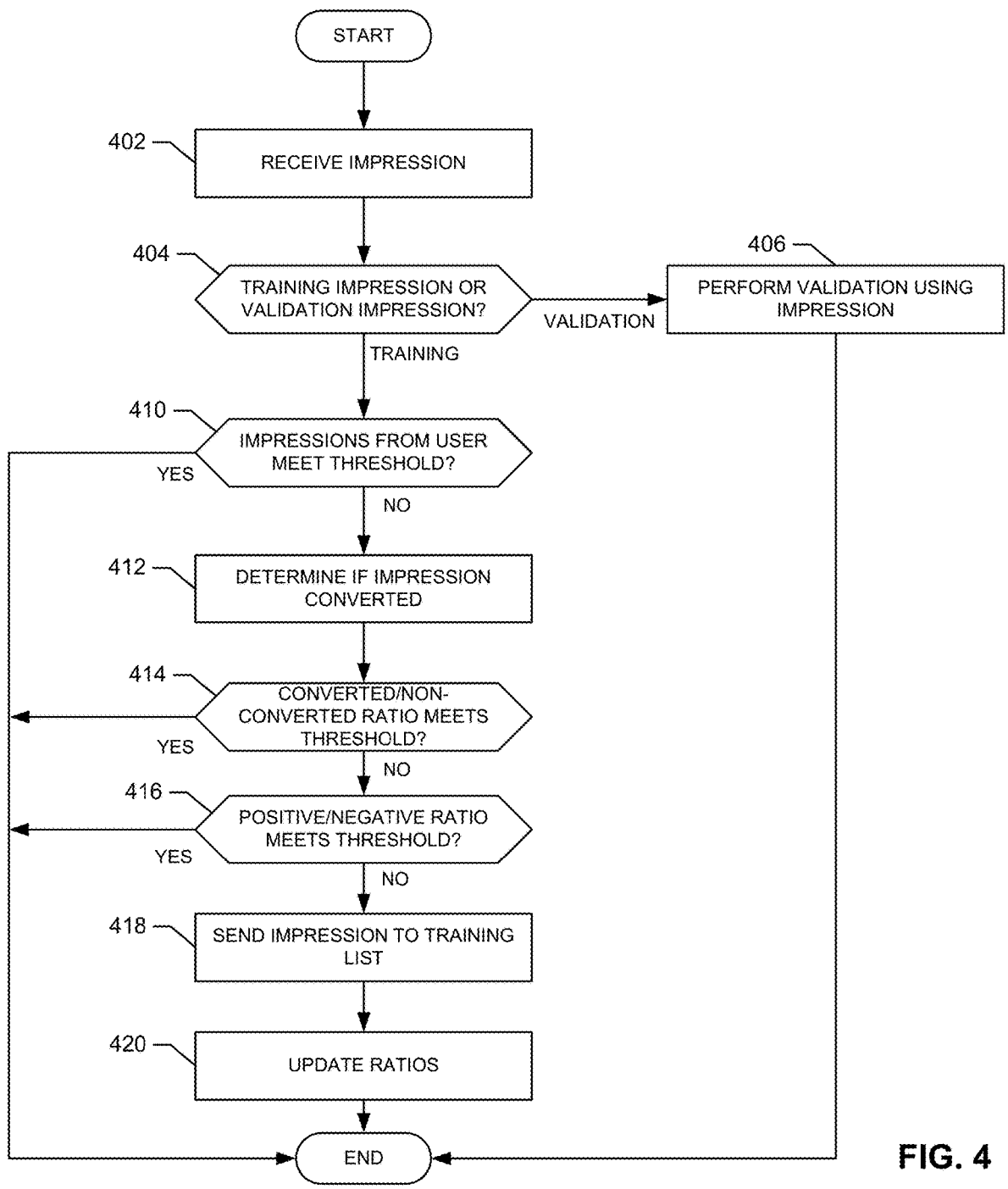
FIGS. 4-6 are flow diagrams representative of example machine readable instructions that may be executed to implement the example trainers and/or the example scorers of FIGS. 1-3.
Figure 5:
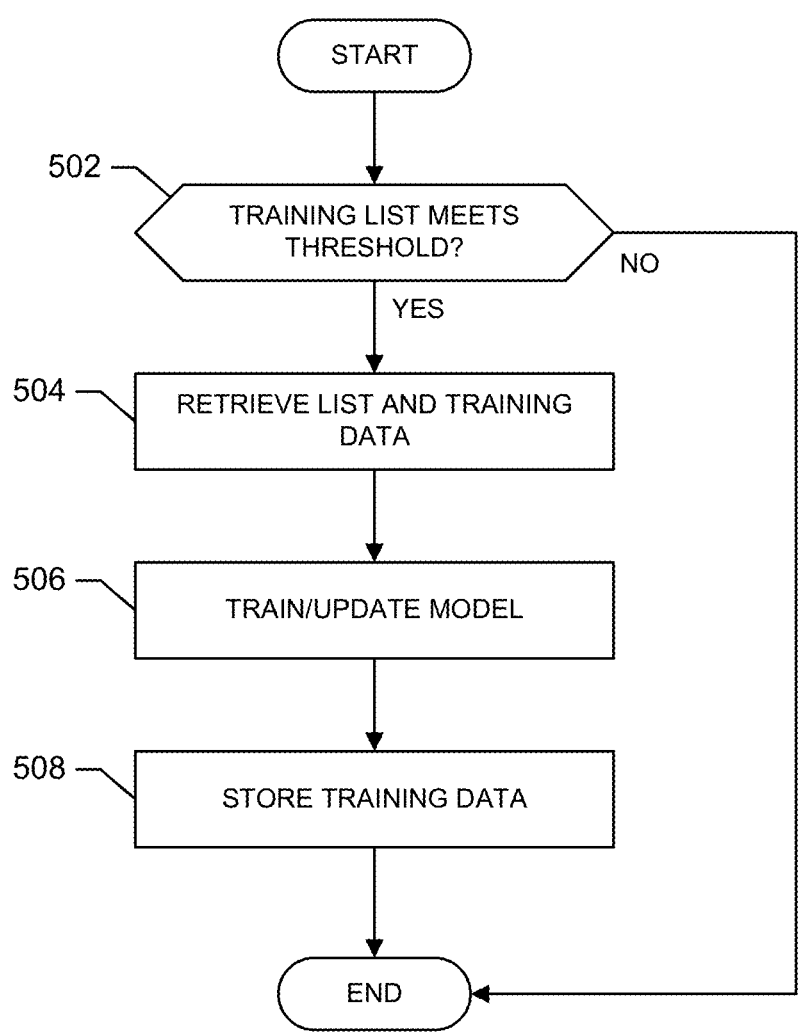

An example implementation of the trainers 152 of FIG. 1 is described in conjunction with FIGS. 2, 4, and 5.

The example list datastores 154 store a list of impressions that have been selected for training. According to the illustrated example, the lists of impressions stored in the list datastores 154 have not been utilized for training and impressions are removed from the lists after training. Alternatively, if a complete history of impressions is desired, the list datastores 154 may additionally store impressions that have been utilized for training and/or impressions that were received by the example trainers 152 but determined to not be used for training (e.g., impressions that the trainers 152 determined would not be used and/or impressions that the trainers 152 determined would be used for validation). The example list datastores 154 are databases. Alternatively, the example list datastores 154 may be any type of storage device and/or data structure such as, for example, a storage array, a file, a network attached storage, a storage device internal to the example trainers 152, etc. According to the illustrated example, each of the example trainers 152 are associated with one of the example list datastores 154 (e.g., the list datastore 154 may be on a storage device installed in the example trainer 152). Alternatively, a central list datastore 154 may be utilized by multiple of the example trainers 152).

The model datastore 156 stores classification models trained by the example trainers 152 and accessed by the example scorers 158 for use in classifying user data. The example model datastore 156 is a database. Alternatively, the example model datastore 156 may be any type of storage device and/or data structure such as, for example, a storage array, a file, a network attached storage, a storage device internal to the example trainers 152 and/or the example scorers 158, etc. While a single model datastore 156 is illustrated, any number and/or combination of types of datastore may be utilized to implement the model datastore 156. According to the illustrated example, each of the example trainers 152 and the example scorers 158 maintain their own local copies of the classification models and update those local copies periodically. For example, when a server implements an example trainer 152 and an example scorer 158, that server may maintain a store of classification models that is shared by the example trainers 152.

The scorers 158 of the illustrated example retrieve classification models from the example model datastore 156 and apply information (e.g., characteristics of a user, prior activities of a user, etc.) for a user or another entity (e.g., the example user computing device 104) associated with a received impression to classify the user or other entity. According to the illustrated example, the impression and associated information is received from the example impression handler 150. Additionally, the example scorers receive impressions and associated information from the example trainers 152 for classifying the information to perform validation of the classification model (e.g., to determine if using the classification model results in classification of the information into a same segment for which the information was previously labeled (e.g., a segment classified deterministically)).

The example classification provider 110 of FIG. 1 includes a plurality of scorers 158 to facilitate real-time scoring of information associated with impressions as those impressions are received. The plurality of scorers 158 may be geographically distributed at multiple data centers to facilitate a rapid response from an impression is received. For example, when the user computer device 104 accesses a webpage at the example media provider 106 and the webpage instructs the example user computing device 104 to transmit a request to the example classification provider 110, it is expected that the classification provider 110 rapidly classify the incoming impression so that if the impression is classified to a segment purchased by the example data buyer 108, the impression handler 150 can respond to the request from the user computing device 104 with an instruction to cause the user computing device 104 to transmit a request to the example data buyer 108 notifying the example data buyer 108 that the user and/or the user computing device 104 is classified in the segment.

Due to the distributed nature of the example scorers 158, a plurality of model datastores 156 may be provided. The example trainers 152 store classification models in the example model datastore 156 and other trainers 152 and/or scorers 158 retrieve the classification models to ensure that, after training/updating a classification model, the trained/updated classification model is utilized by the example scorers 158.

Figure 3:
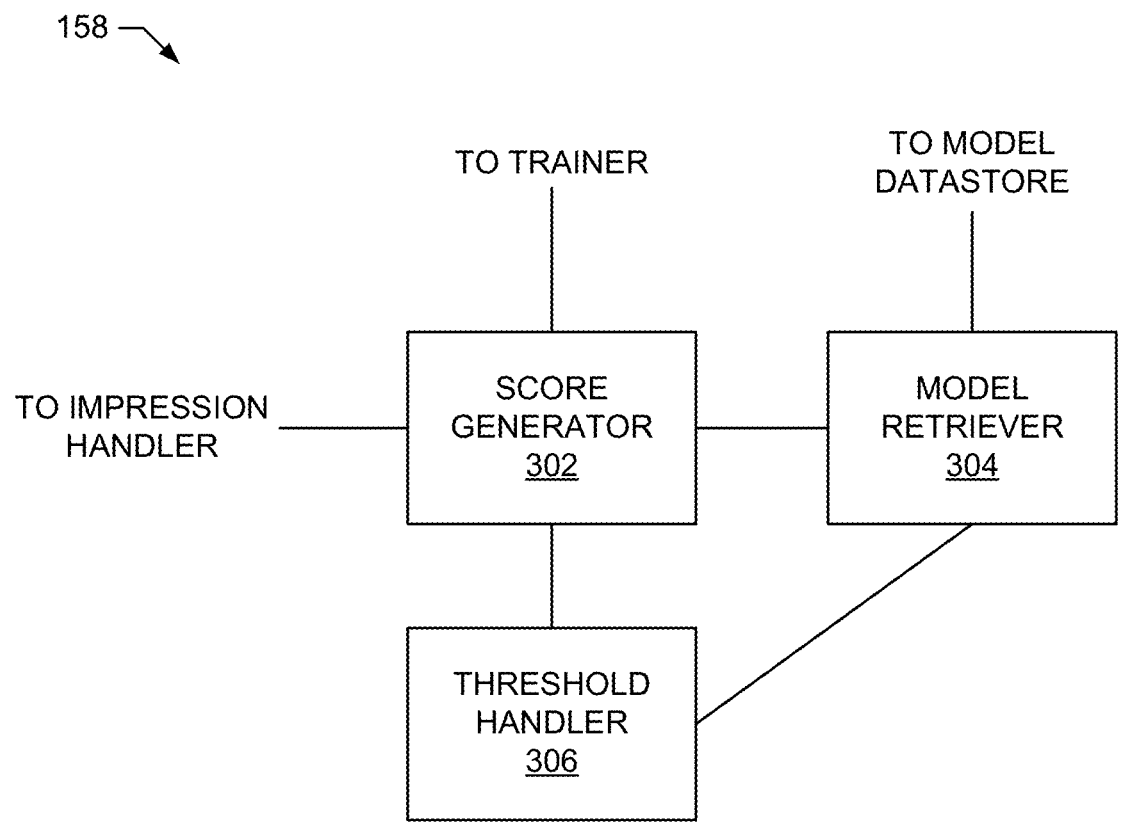
FIG. 3 is a block diagram of an example implementation of the example scorers of FIG. 1.
Figure 6:
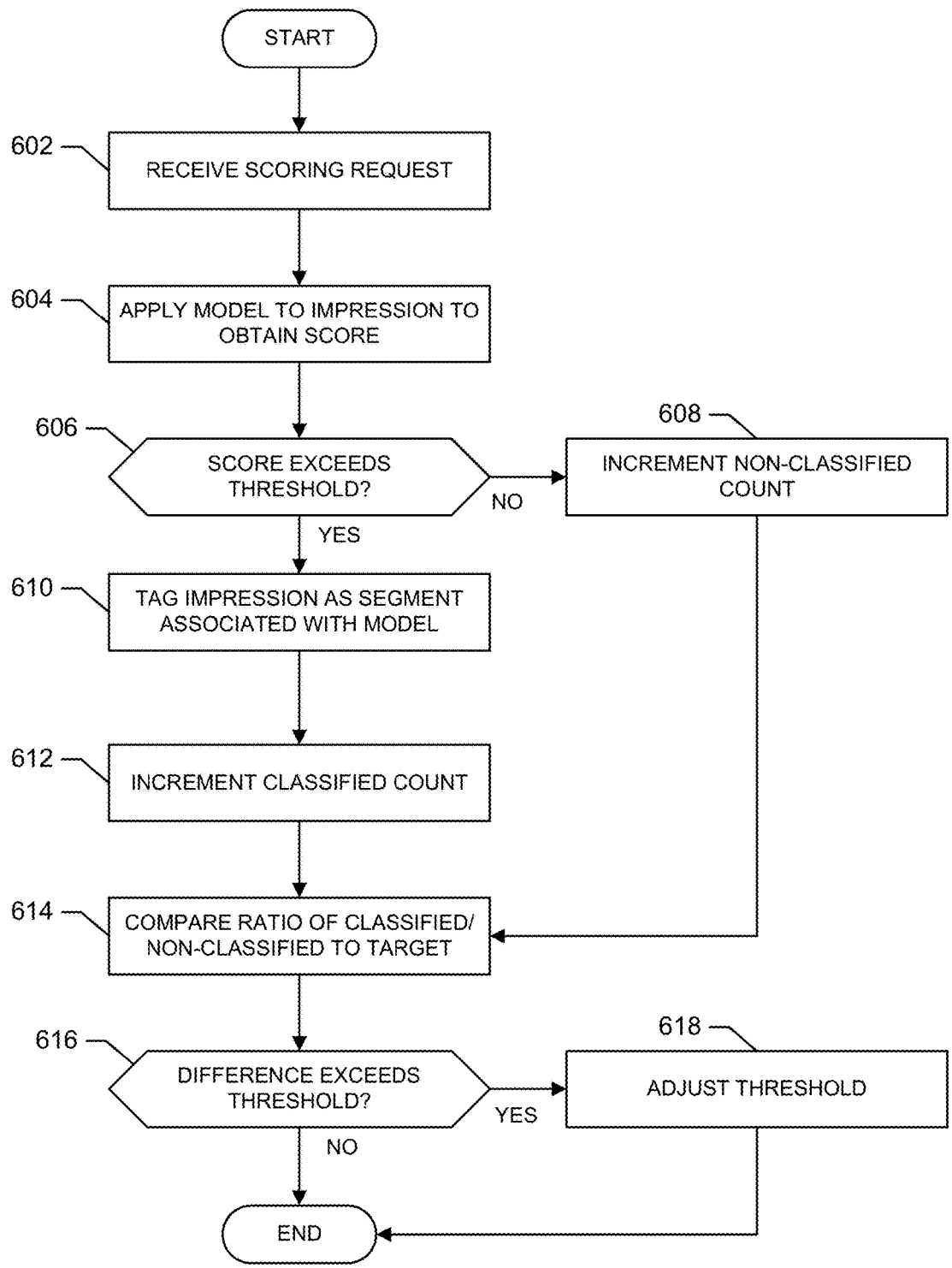

An example implementation of the scorers 158 is described in conjunction with FIGS. 3 and 6.

In operation of the example environment 100, a user utilizes the example user computing device 104 to access a webpage served by the example media provider 106. The webpage served by the example media provider 106, when presented by the example user computing device 104, causes the example user computing device 104 to transmit a request/notification to the example classification provider 110 via the example network 102. The example impression handler 150 transmits the impression to the example trainers 152 for determining if the impression will be utilized for training a classification model and/or transmits the impression to the example scorers 158 (e.g., for determining if the impression is to be classified to a segment for which the impression has not already been classified (e.g., previously classified by a deterministic classification)).

The example trainers 152 determine (e.g., one of the example trainers 152) if the impression will be utilized (e.g., by updating a ratio and comparing the ratio to a threshold). When the impression is to be utilized, the example trainers 152 store the impression in the example list datastores 154 (e.g., one of the example list datastores 154 associated with the one of the example trainers 154) with an identification of a classification model for which the impression will be utilized for training (e.g., a classification model associated with a segment for which the impression was labeled after classification by a deterministic classification process or a classification model for which the impression is a negative impression). Periodically, the example trainers 152 determine if impressions (e.g., online originated impressions, offline originated impressions, etc.) stored in the list datastores 154 meet a threshold quantity and/or a threshold age and, when a threshold is met, retrieves the latest classification model(s) from the example model datastore 156 trains and/or updates the associated classification model using the impression and other impressions stored in the example list datastores 154. The example trainers 152 store the trained/updated classification model in the example model datastore 156, which are periodically retrieved by the example scorers 158. Accordingly, impressions received during operation of the example classification provider 110 are utilized for training/updating classification models in a more computationally efficient manner than prior systems because the classification model can be updated without re-training on impressions used during prior trainings.

FIG. 2 is a block diagram of an example implementation of the trainers 152 of the example classification provider 110 of FIG. 1. The example trainer 152 of FIG. 2 includes an example impression analyzer 202, an example store interface 204, an example scoring interface 206, an example list analyzer 208, and an example model trainer 210.

The example impression analyzer 202 receives impressions from the example impression handler 150 of FIG. 1 and determines if a received impression will be discarded, used for training, or used for validating a classification model. To determine how an impression will be utilized, the example impression analyzer 202 analyzes characteristics associated with the impression. For example, according to the illustrated example, the example impression analyzer 202 analyzes information associated with the impression to identify a user identifier (e.g., a cookie identifier) associated with the impression, to determine if the impression is associated with a segment (e.g., by way of deterministic classification), and to determine if the impression is associated with a conversion (e.g., the impression is associated with a segment for which a targeted advertisement was served to the user and the user clicked-on or otherwise acted-on the advertisement to visit a website associated with the advertisement and/or to purchase a product associated with the advertisement).

Because the impressions available for real-time training of the example classification models depend on what types of impressions (e.g., converted impressions, non-converted impressions, impressions that were classified for the segment of the classification model (positive training events), impressions that were not classified for the segment of the classification model (negative training events), impressions from a particular user, etc.), the example impression analyzer 202 tracks ratios of impression types utilized in training classification models and determines how the impressions will be utilized (e.g., used for training, used for validation, not used) to balance the impressions used for training according to one or more thresholds. Without performing balancing, the impressions utilized for training may be skewed to a particular type of impression, which may result in a poorly trained classification model (e.g., typically the number of impressions that are not classified for any particular segment (negative impressions) will greatly exceed the number of impressions classified for the particular segment (positive impressions)). While example parameters and ratios are described herein, any number of parameters and/or characteristics may be analyzed by the example impression analyzer 202.

When the example impression analyzer 202 determines that an impression will be used for training, the impression analyzer 202 transmits the impression to the example store interface 204 for storage in the example list datastore 154 associated with the example trainer 152. When the example impression analyzer 202 determines that an impression will be used for validation, the impression analyzer 202 transmits the impression to the example scoring interface 206 for scoring and validation of the result of the scoring (e.g., determining if scoring the impression using a classification model associated with a segment for which the impression is labeled results in a classification for the segment (e.g., confirms that the classification model generates the correct result)).

The example store interface 204 stores and retrieves information from the example list datastore 154 associated with the example trainer 152 and the example model datastore 156. The example store interface 204 is a database management system. Alternatively, the store interface 204 may be implemented by any type of interface to a datastore such as, for example, a file interface, a disk drive interface, etc. The trainer 152 may include multiple store interfaces 204 that may be implemented by different types of interfaces based on the type of datastores to be accessed.

The example scoring interface 206 communicatively couples the example impression analyzer 202 with the example scorers 158. When the example impression analyzer 202 determines that an impression is to be used for validation, the example impression analyzer 202 transmits the impression to the example scoring interface 206 and the example scoring interface 206 transmits the impression to the example scorers 158 for classification and validation of a classification model. For example, the example scoring interface 206 transmits the impression with the characteristics and parameters associated with the user associated with the impression. In addition, the example scoring interface 206 transmits an identification, label, etc. indicating a segment previously classified for the impression (e.g., a classification determined by deterministic classification, a classification determined due to a user responding to an advertisement associated with the segment (e.g., a converted impression), etc.

The example list analyzer 208 monitors the example list datastore 154 associated with the example trainer 152 via the example store interface 204 to determine when impressions in the example list datastore 154 are ready to be used for training a classification model. According to the illustrated example, for each classification model having training impressions stored in the example list datastore 154, the list analyzer 208 periodically or aperiodically retrieves the number of impressions and/or the age (e.g., how much time has passed since the first impression was added) of the impressions. The example list analyzer 208 compares the number of impressions and/or the age to thresholds to determine if training should be triggered (e.g., when the number of impressions and/or the age exceeds a threshold). For example, in some cases, the number of impressions threshold may be 1000, 100, 1, or any other number to balance the training workload (e.g., a greater number reduces the number of trainings but a smaller number results in a more frequently trained classification model). For example, in some cases, the age threshold may be 1 week, 24 hours, 1 hour, 0 minutes or any other number to balance the training workload (e.g., a greater number reduces the number of trainings but a smaller number results in a more frequently trained classification model). When the example list analyzer 208 determines that training should be triggered, the example list analyzer 208 retrieves the impressions and the associated characteristics and/or parameters and transmits the information to the example model trainer 210.

The example model trainer 210 receives impression information including an identification of a segment to which the impressions are either positive or negative training events from the example list analyzer 208 when training is to be triggered. The example model trainer 210 retrieves the classification model to be trained/updated for the segment from the example model datastore 156 via the example store interface 204 (or generates a new classification model if a classification model for the identified segment does not yet exist). The example model trainer 210 then trains/updates the classification model using the received impressions. According to the illustrated example, the model trainer 210 trains/updates classification models using stochastic gradient descent to generate/update classification model vector weights that are utilized for scoring events according to the classification model. Additionally or alternatively, the model trainer 210 may utilize any other algorithm (e.g., L1 regularization, L2 regularization, perceptron, etc.). The example model trainer 210 stores the trained/updated classification model in the example model datastore 156 via the example store interface 204 and also stores a local copy of the classification model.

In operation of the example trainer 152 of FIG. 2, the example impression analyzer 202 receives an impression and determines if the impression will be: 1) discarded (e.g., too many impressions have been received from the user associated with the impression, too many of the type of impression have been received (e.g., too many negative training events, too many converted training events, too many non-converted training events, etc.), 2) utilized for validation, or 3) utilized for training.

When the impression analyzer 202 determines that the impression will be utilized for validation, the impression analyzer 202 transmits the impression and associated information to the example scorers 158 via the example scoring interface 206 for scoring and comparison with a segment already classified for the impression (e.g., a deterministically classified segment). The result of the validation can be analyzed to determine if the validated classification model is providing reliable classifications. Based on the validation, a scoring threshold can be adjusted. For example, the value computed from applying a classification model to an impression is compared with a threshold and when the value meets the threshold, the impression is classified for the segment associated with the classification model. If an impression should be classified for a segment but, according to the current threshold, is not classified during validation, the scoring interface 206 may adjust the threshold to make the classification model more sensitive. Alternatively, if an impression should not be classified for a segment but, according to the current threshold, is classified during validation, the scoring interface 206 may adjust the threshold to make the classification model less sensitive.

When the impression analyzer 202 determines that an impression is to be used as a training event, the impression analyzer 202 stores the impression in the example list datastore 154 via the example store interface 204. When the list analyzer 208 determines that a sufficient number of impressions for a classification model or a sufficient age of impressions for a classification model are stored in the example list datastore 154, the example model trainer 210 retrieves the classification model from the example model datastore 156, and trains/updates a classification model using the impressions. The example model trainer 210 stores the classification model in the example model datastore 156 to be periodically or aperiodically retrieved by the example scorers 158 of the example classification provider 110. Accordingly, in substantially real-time as impressions are received, classification models are trained/updated without the need for re-training on the entire history of impressions. Accordingly, classification models can continue to improve based on adding additional training events and can adapt to a potentially changing environment of impressions and classifications.

While an example manner of implementing the trainers 152 of FIG. 1 is illustrated in FIG. 2, one or more of the elements, processes and/or devices illustrated in FIG. 2 may be combined, divided, re-arranged, omitted, eliminated and/or implemented in any other way. Further, the example impression analyzer 202, the example store interface 204, the example scoring interface 206, the example list analyzer 208, the example model trainer 210, and/or more generally the example trainer 152 of FIG. 2 may be implemented by hardware, software, firmware and/or any combination of hardware, software and/or firmware. Thus, for example, any of the example impression analyzer 202, the example store interface 204, the example scoring interface 206, the example list analyzer 208, the example model trainer 210, and/or more generally the example trainer 152 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example impression analyzer 202, the example store interface 204, the example scoring interface 206, the example list analyzer 208, and/or the example model trainer 210 is/are hereby expressly defined to include a tangible computer readable storage device or storage disk such as a memory, a digital versatile disk (DVD), a compact disk (CD), a Blu-ray disk, etc. storing the software and/or firmware. Further still, the example trainers 152 of FIG. 1 may include one or more elements, processes and/or devices in addition to, or instead of, those illustrated in FIG. 2, and/or may include more than one of any or all of the illustrated elements, processes and devices.

FIG. 3 is a block diagram of an example implementation of the scorers 158 of FIG. 1. The example scorer 158 of FIG. 3 includes an example score generator 302, an example model retriever 304, and an example threshold handler 306.

The example score generator 302 receives classification model scoring requests from the example impression handler 150 of FIG. 1 and from the example trainers 152 of FIG. 1. The requests from the example impression handler 150 are requests to determine a segment for the impression by iteratively analyzing each of the classification models. The requests from the example trainers 152 are requests to validate a particular classification model(s) based on segments previously identified for the impression (e.g., by deterministic classification). In either event, the example score generator 302 utilizes a local copy of the classification model or retrieves the classification model(s) to be utilized from the example model datastore 156 via the example model retriever 304 (e.g., retrieves from the model datastore 156 when a threshold amount of time has passed since the last update). The example score generator 302 generates a scoring value(s) by applying the characteristic and/or parameters associated with the impression to the retrieved classification model(s). The example score generator 302 sends the scoring value(s) to the example threshold handler 306 to determine if the scoring value(s) exceeds the threshold(s) associated with the classification model(s).

When the impression was received from the example impression handler 150, the example score generator 302 notifies the impression handler 150 of any segments for which the scoring value meets the threshold indicating that the impression is to be classified for the segment.

When the impression was received from the example trainers 152, the example score generator 302 determines if the classification model to be validated resulted in a correct classification (e.g., either correctly classified or correctly not classified) and notifies the example trainers 152 so that the trainers 152 can increment the count of classifications/non-classifications. If the example trainers 152 (e.g., the example scoring interface 206) determine that an adjustment to thresholds is desired based on the validation, the example trainers 152 notify the example score generator 302, which instructs the example threshold handler 306 to adjust the thresholds.

The example model retriever 304 stores and retrieves classification models from the example model datastore 156. The example model retriever 304 is a database management system. Alternatively, the model retriever 304 may be implemented by any type of interface to a datastore such as, for example, a file interface, a disk drive interface, etc. According to the illustrated example, the model retriever 304 receives an identifier of a desired classification model(s) from the example score generator 302 and retrieves the classification model(s) identified by the identifier from the example model datastore 156. Alternatively, the classification model(s) may be identifier in any other manner.

The example threshold handler 306 receives scoring values from the example score generator 302 and determines if the scoring values meet the thresholds for the associated classification models. According to the illustrated example, the threshold handler 306 receives and stores the thresholds with the classification models via the example model retriever 304. Alternatively, the threshold handler 306 may store the thresholds itself.

While an example manner of implementing the scorers 158 of FIG. 1 is illustrated in FIG. 3, one or more of the elements, processes and/or devices illustrated in FIG. 3 may be combined, divided, re-arranged, omitted, eliminated and/or implemented in any other way. Further, the example score generator 302, the example model retriever 304, the example threshold handler 306, and/or, more generally, and/or more generally the example scorers 158 of FIG. 3 may be implemented by hardware, software, firmware and/or any combination of hardware, software and/or firmware. Thus, for example, any of the example score generator 302, the example model retriever 304, the example threshold handler 306, and/or, more generally, and/or more generally the example scorers 158 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example score generator 302, the example model retriever 304, and/or the example threshold handler 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example scorers 158 of FIG. 1 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example trainers 152 of FIGS. 1 and 2 are illustrated in FIGS. 4 and 5. In these examples, the machine readable instructions comprise program(s) for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4 and 5, many other methods of implementing the example trainers 152 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The process of FIG. 4 begins when the example impression analyzer 202 receives an impression (e.g., receives an impression from the example impression handler 150 of the example classification provider 110 of FIG. 1) (block 402). The example impression analyzer 202 determines if the received impression will be used for training or validation (block 404). For example, the example impression analyzer 202 determines if the impression is labeled for a segment (e.g., by a previously performed deterministic classification) and then analyzes a ratio of training impressions to validation impressions for the classification model associated with the labeled segment. A threshold may be utilized to determine if the ratio indicates that the impression should be utilized for training or validation (e.g., a threshold may indicate that there should be one hundred times more impressions utilized for training than for validation). The example impression analyzer 202 determines that some impressions will be utilized as negative training or validation events. For example, the impression analyzer 202 may randomly assign an impression for training and/or validation of a classification model associated with a segment when the impression has been labeled for another segment. In such an instance, the same ratios may be analyzed to determine if the negative impression will be utilized for training or validation. According to the illustrated example, impressions from users from which prior impressions were utilized for training are excluded from use for validation and, thus, assigned for additional training. impressions from users from which prior impressions were utilized for validation are excluded from use for training.

When the example impression analyzer 202 determines that the impression is to be utilized for validation (block 404), the example scoring interface 206 performs validation of the classification model associated with the labeled segment to validate the accuracy of the classification model (block 406). For example, the scoring interface 206 may transmit the impression to the example scorers 158 for scoring using the classification model associated with the identified segment and, based on the result, may adjust a threshold associated with the classification model (e.g., when the scoring using the current threshold does not classify the impression for the segment, the scoring interface 206 may decrease the threshold to cause the scoring to meet the threshold for classification). Additionally or alternatively, the scoring interface 206 may issue an alert when the scoring does not correctly validate (e.g., a false positive or a false negative) and/or when a sufficient number of scorings do not correctly validate (e.g., when 10 consecutive validations are incorrect).

When the example impression analyzer 202 determines that the impression is to be utilized training, the example impression analyzer 202 determines if the number of impressions from the user associated with the impression meet a threshold for the classification model to be trained (block 410). The number of impressions from the user is analyzed to ensure that a particular user does not become overly represented in training, which could skew the model results or prevent them from accurately assessing impressions from a population. For example, the example model datastore 156 may store a hash table tracking hashes of user identifiers along with counts of how many impressions have been utilized for training and/or a counts of how many impressions have been utilized for validation for each classification model for a period of time (e.g., the past 24 hours). When the impressions from the user meet the threshold, the impression is discarded and the process of FIG. 4 terminates.

When the number of impressions from the user do not meet a threshold (block 410), the example impression analyzer 202 determines if the impression is labeled as converted (block 412). For example, the impression may be labeled as converted when a targeted advertisement associated with a segment labeled for the impression was presented and was selected by the user (e.g., a banner advertisement was presented the user clicked-on the advertisement). The impression analyzer 202 then analyzes a ratio of converted to non-converted impressions previously utilized for training of the classification model to determine if the ratio meets a threshold (block 414). For example, the impression analyzer 202 may determine a difference between the current ratio of converted to non-converted impressions and a desired ratio and determine if the difference meets or exceeds a threshold. Such a threshold provides a tolerance between the current ratio and the desired ratio to avoid discarding impressions. When the difference does not meet a threshold, the impression analyzer 202 may determine if the current impression will reduce the difference or will increase the difference. When the ratio does not meet the threshold (e.g., and adding the current impression would increase the difference), the impression is discarded and the process of FIG. 4 terminates.

When the ratio meets the threshold (block 414) (e.g., or the current impression will reduce the difference), the example impression analyzer 202 determines if a ratio of positive to negative training impressions meets a threshold. For example, a positive impression is an impression labeled with a segment that the impression analyzer 202 determines will be used for training a classification model associated with the same segment and a negative impression is an impression labeled with a segment that is not associated with the classification model for which the impression will be used for training (or the impression is not labeled for any segments). The impression analyzer 202 may determine a difference between the current ratio of positive to negative impressions and a desired ratio and determine if the difference meets or exceeds a threshold. For example, a desired ratio of positive to negative impressions may be 10:1. When the difference does not meet a threshold, the impression analyzer 202 may determine if the current impression will reduce the difference or will increase the difference. When the ratio does not meet the threshold (e.g., and adding the current impression would increase the difference), the impression is discarded and the process of FIG. 4 terminates.

When the ratio meets the threshold (block 416) (e.g., or the current impression will reduce the difference), the example store interface 204 transmits the impression to the example list datastore 154 for use in training (block 418). The example store interface 204 stores the impressions in collections based on the impression type (e.g., collection storing impressions that are labeled as being converted, a collection storing impressions labeled as non-converted, etc.). Then, the example store interface 204 updates the impression ratios associated with the classification for which the impression will be utilized for training (block 420). For example, the store interface 204 may increment counters in the example list datastore 154 associated with the classification model. Example counters include a number of impressions utilized for training, a number of impressions for the user associated with the impression, a number of converted impressions utilized for training, a number of non-converted impressions utilized for training, a number of positive impressions utilized for training, a number of negative impressions utilized for training, etc.

After storing the impression (block 418) and updating the ratios (block 420), the process of FIG. 4 terminates.

Accordingly, the example process illustrated in FIG. 4 automatically supervises and curates the use of impressions for training events to ensure that the training process is not overly skewed by impression from a particular user, impressions that are converted/non-converted, impressions that are positive or negative, etc. While example analyses and corresponding ratios are illustrated in FIG. 4, other analyses and/or ratios may be additionally or alternatively utilized. For example, the impressions could be curated based on time of day, day of the week, originating webpage and/or media provider, whether an impression is a mobile impression or not, etc.

FIG. 5 is a flowchart illustrating an example process to perform training when a sufficient number of training impressions have been stored in the example list datastore 154. According to the illustrated example, the process of FIG. 5 is initiated each time the process of FIG. 4 terminates. Alternatively, the process of FIG. 5 could operate continuously in parallel with the operation of FIG. 4, could be periodically or aperiodically executed, etc.

When the process of FIG. 5 is initiated, the example list analyzer 208 determines, via the example store interface 204, whether a training list for a classification model (e.g., the classification model for which an impression was just added during operation of the process of FIG. 4, any classification model stored in the example list datastore 154, etc.) in the example list datastore 154 meets a threshold (block 502). According to the illustrated example, the example list analyzer 208 compares the training list to an age threshold (e.g., a period of time that has passed since the first impression was added to the training list for a classification) and a size threshold (e.g., a total number of impressions ready for training). When a sufficiently old training list or a sufficiently large training list is not identified, the process of FIG. 5 terminates to wait for more time to pass or for more impressions to be added.

When the training list is ready for training (block 502) (e.g., a sufficient aged or sized training list is identified), the example list analyzer 208 retrieves the impressions and associated information (e.g., user characteristics, past activity, etc.) awaiting training from the example list datastore 154 via the example scoring interface 204 (block 504). The example model trainer 210 then trains a new classification model (e.g., if a classification model for a segment associated with the training list has not previously been trained) or updates an existing classification model (e.g., retrieved from the example model datastore 156 via the example store interface 204) for a segment associated with the training list (block 506). According to the illustrated example, the model trainer 210 utilizes a stochastic gradient descent algorithm to train/update a classification model by incrementally adding impression information to the classification model without the need to add previously trained information each time (e.g., a classification model can be updated without perform a full re-training using all previously received training data). The example model trainer 210 then transmits the trained/updated classification model to the model datastore 156 via the example store interface 204 (block 508). The process of FIG. 5 then terminates.

When the example model trainer 210 determines that it is time for an update (block 510), the example model trainer 210 transmits the trained/updated classification model to the plurality of example scorers 158 (e.g., transmits the classification model from the centralized example model datastore 156 to the example scorers 158 for use in scoring impressions) (block 512). While the illustrated example utilizes a plurality of scorers 158 in a distributed environment to manage the workload of real-time scoring, a single scorer 158 may, alternatively, be utilized.

After the example model trainer 210 updates the example scorers 158, the process of FIG. 5 terminates.

A flowchart representative of example machine readable instructions for implementing the example scorers 158 of FIG. 1 is illustrated in FIG. 6. In this example, the machine readable instructions comprise program(s) for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 6, many other methods of implementing the example scorers 158 may alternatively be used. For example, the order of execution of the blocks may be changed, and/or some of the blocks described may be changed, eliminated, or combined.

As mentioned above, the example process of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The process of FIG. 6 begins when the example score generator 302 receives a scoring request from the example impression handler 150 or from the example scoring interface 206 of the example trainers 152 (block 602). For example, the scoring request may be a request to score a received impression for classifying the impression (e.g., to provide classification information to the example data buyer 108). Alternatively, the scoring request may be a request from the example trainers 152 to score an impression for validating a classification model.

The example score generator 302 retrieves a classification model via the example model retriever 304 and determines a score for the impression utilizing the retrieved classification model (block 604). In some examples, the example score generator 302 may use a classification stored locally at the example score generator 302 rather than retrieving the updated classification each time a scoring request is received. For example, the classification model may only be retrieved after a threshold period of time has passed since a last update (e.g., a prior retrieval of the classification model or a local training/update of the classification model). When the scoring request is a request to classify an impression all or a subset of the available classification models may be retrieved and scored. For ease of description, FIG. 6 illustrates retrieving and scoring a single classification model. Alternatively, multiple classification models could be iteratively retrieved and scored by repeating blocks 606-616.

After applying the classification model to the impression associated with the scoring request, the example threshold handler 306 determines if the score exceeds a threshold for classification (block 606). When the score does not exceed the threshold, a count of impressions that are not classified is incremented (e.g., the impression is not labeled for the segment of the classification model) (block 608) and control proceeds to block 614 for analyzing the classification results.

When the score exceeds the threshold (block 606), the example score generator 302 tags/labels the impression for the segment associated with the classification model (block 610). For example, the impression and, thereby, the user associated with the impression may be labeled with the segment of each classification model for which the score exceeds the associated with the threshold. The example score generator 302 increments a counter for classified segments for the classification model (block 612).

After the non-classified counter is incremented (block 608) or the classified counter is incremented (block 612), the example score generator 302 compares a ratio of the classified counter to the non-classified counter to a target ratio (block 614). For example, the target ratio may be a desired ratio for classification (e.g., an administrator may set a target ratio that one tenth of the impressions should be classified). The example score generator 302 determines if a difference between the determined ratio and the target ratio meets a threshold (block 616). When the difference meets the threshold, the example score generator 302 adjusts the scoring threshold utilized for determining if a classification model score is sufficient to classify an impression (block 618). Additionally or alternatively, the score generator 302 may adjust the threshold when a difference between a classification rate (e.g., segment generation rate such as the number of segment classified per minute, per hour, per day, etc.) and a target classification rate, meets a threshold. For example, if too few impressions have been classified to a segment, the example score generator 302 will reduce the scoring threshold and if too many impressions have been classified, the example score generator 302 will increase the scoring threshold (e.g., in an implementation in which a greater score indicates a more likely classification). Alternatively, when the difference does not exceed the threshold for the ratio difference, the process of FIG. 6 terminates without adjusting the threshold.

Figure 7:
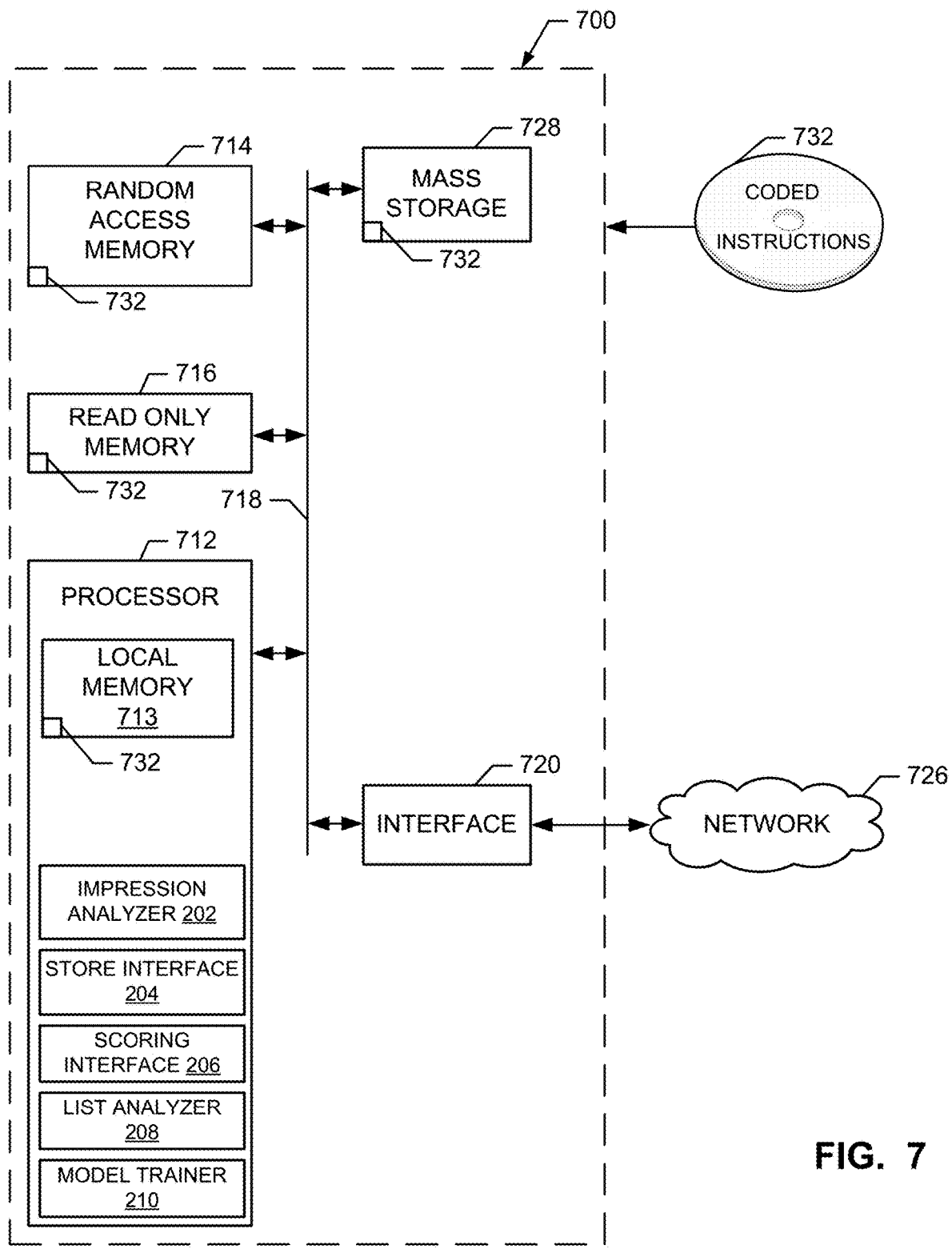
FIGS. 7-8 are a block diagrams of an example processor systems structured to execute the example machine readable instructions represented by FIGS. 4-6 to implement the example scorers and/or the example trainer of FIGS. 1-3.

FIG. 7 is a block diagram of an example processor platform 700 capable of executing the instructions of FIGS. 4-5 to implement the example trainers 152 of FIGS. 1 and/or 2. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The example processor 712 includes the example impression analyzer 202, the example store interface 204, the example scoring interface 206, the example list analyzer 208, and the example model trainer 210. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 4 may be stored in the mass storage device 728, in the volatile memory 714, in the non-volatile memory 716, and/or on a removable tangible computer readable storage medium such as a CD or DVD.

Figure 8:
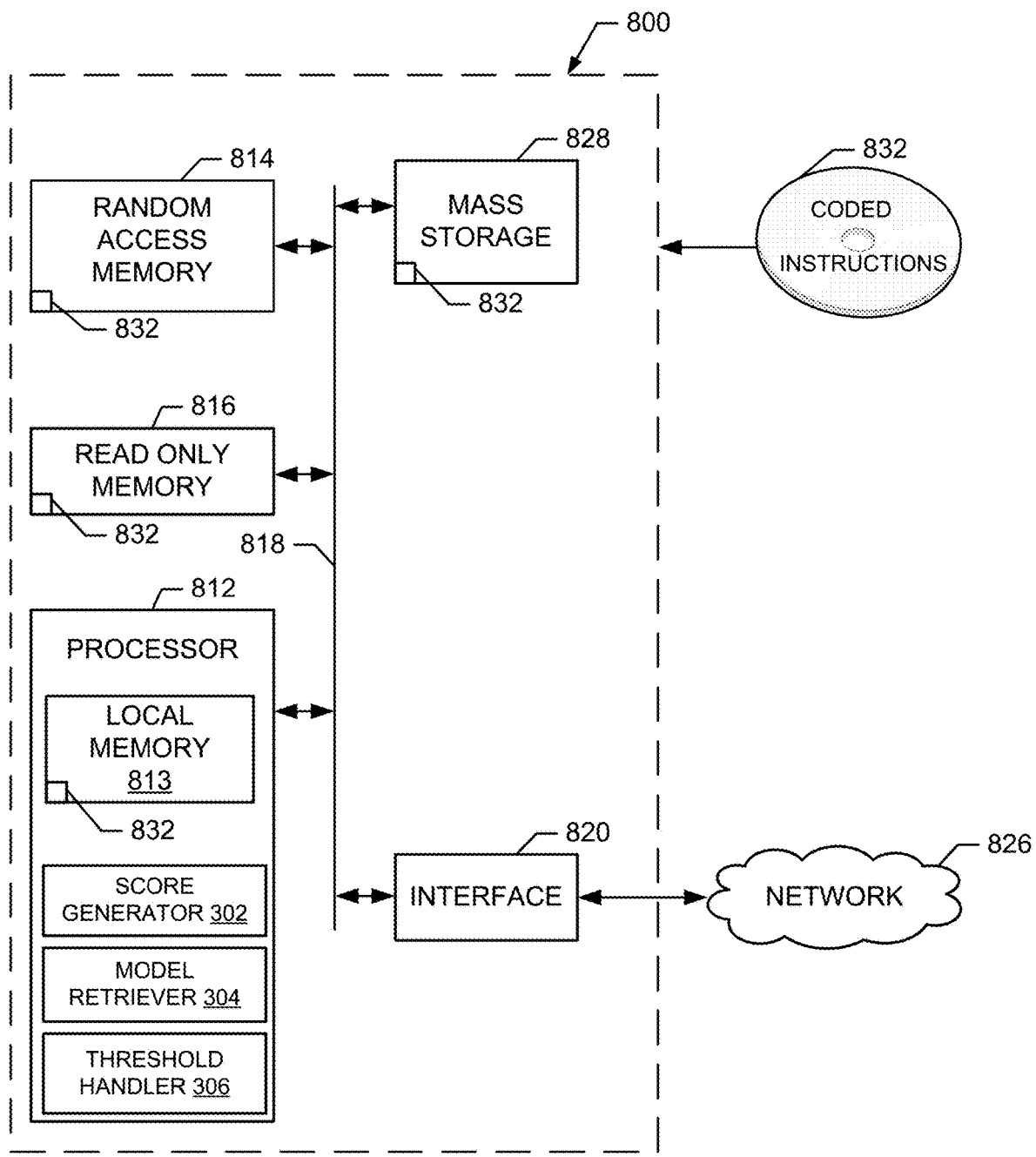

FIG. 8 is a block diagram of an example processor platform 800 capable of executing the instructions of FIG. 6 to implement the example scorers 158 of FIGS. 1 and/or 3. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The example processor 812 includes the example score generator 302, the example model retriever 304, and the example threshold handler 306. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 4 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture facilitate the ongoing training (e.g., in substantially real-time) of a classification model for classifying online users and/or activity. While the disclosed methods, apparatus, and articles of manufacture benefit from improved accuracy of classification models, increased speed to market, reduced storage requirements, and an increase in the quantity of the training models that can be supported, they also achieve reduced consumption of computing resources (e.g., processing resources, memory resources, etc.) by curating the impressions/training events and utilizing a classification model optimization method (e.g., stochastic gradient descent) that facilitates incremental training of a classification model without the need to re-train on an entire training set during each desired training/update. By curating the impressions/training events, the classification models can be automatically trained (e.g., with limited or no user intervention) on impressions that are substantially randomly received without the classification models being skewed by the relative quantities of types of randomly received impressions.

While the foregoing description discusses impressions that are received from user computing devices as directed by a webpage of a website, impressions may be received in any other manner. For example, an impression may be received from offline data (e.g., television viewing activity, radio listening activity, purchases in a bricks-and-mortar store, etc.). In some examples, offline data is imported to the classification provider 110 as simulated online data. For example, the offline data is transmitted to the example impression handler 150 as individual impression events using the same type of message (e.g., a hypertext transfer protocol request) as is used by the user computing device 104 to transmit the impression at the instruction of the webpage of the example media provider 106. The offline data may be matched/tagged to the same user identifiers used for online data (e.g., cookie identifier values) (e.g., the offline data may be transmitted in a manner that simulates/spoofs the online data submission). Alternatively, offline data (or any other data that identifies impressions) may be imported, loaded, retrieved, accessed, etc. by the classification provider 110 in any other manner that allows the example impression handler 150 and/or the example trainers 152 to process the data for classification model training.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A method for training classification models, the method comprising:

determining, by executing an instruction with at least one processor, a segment associated with a received impression indicative of access to media on a webpage;

determining, by executing an instruction with the at least one processor, that the received impression includes an indication that the received impression is a converted impression that is associated with a conversion;

determining, by executing an instruction with the at least one processor, a current ratio of converted to non-converted impressions associated with a classification model associated with the segment;

determining, by executing an instruction with the at least one processor, a difference between the current ratio and a target ratio;

storing an indication of the received impression in a training list of the classification model associated with the segment when: (a) the difference does not meet a threshold or (b) counting the received impression in the current ratio would reduce the difference by including an additional converted impression in training data for the classification model;
updating the classification model using impressions identified in the training list to generate an updated classification model;
receiving a subsequent media access associated with an impression;
generating, using the updated classification model, a score indicating whether the subsequent media access will result in a conversion;
adding the impression associated with the subsequent media access to the training list based on the score indicating that the impression is associated with a conversion; and
updating the classification model using the impression added to the training list to generate an updated classification model.

2. The method as defined in claim 1, wherein the indication of the received impression is stored in the training list when: the current ratio exceeds the threshold because a count of non-converted impressions causes the difference to exceed the threshold and the received impression includes an indication that the received impression resulted from a conversion.

3. The method as defined in claim 1, wherein the received impression includes an indication that the received impression resulted from a conversion associated with the segment when a previous advertisement associated with the segment was selected by a user associated with the received impression.

4. The method as defined in claim 1, further including:
determining a user associated with the received impression;
determining a count of times that impressions associated with the user were previously utilized for training the classification model, and
discarding the received impression in response to determining that the count exceeds a user threshold.

5. The method as defined in claim 1, wherein determining the segment includes determining the segment based on prior online activity of a user computing device associated with the segment.

6. The method as defined in claim 1, wherein the updating is performed in response to detecting that the training list meets a list threshold.

7. The method as defined in claim 1, wherein the updating the classification model is performed utilizing impressions identified in the training list without utilizing previous impressions that were previously utilized for the updating of the classification model.

8. A system for training classification models, the system comprising:
an impression handler implemented by processor circuitry to receive an impression from a user computing device and to determine a segment associated with a received impression indicative of access to media on a webpage;
a trainer implemented by the processor circuitry to:
determine that the received impression includes an indication that the received impression is a converted impression that is associated with a conversion, and
determine a current ratio of converted to non-converted impressions associated with a classification model associated with the segment;
determine a difference between the current ratio and a target ratio;
a datastore to store an indication of the received impression in a training list of the classification model associated with the segment when: (a) the difference does not meet a threshold or (b) counting the received impression in the current ratio would reduce the difference by including an additional converted impression in training data for the classification model; and
a scorer implemented by the processor circuitry to:
update the classification model using impressions identified in the training list to generate an updated classification model;
receive a subsequent media access associated with an impression;
generate, using the updated classification model, a score indicating whether the subsequent media access will result in a conversion;
add the impression associated with the subsequent media access to the training list based on the score indicating that the impression is associated with a conversion; and
update the classification model using the impression added to the training list to generate an updated classification model.

9. The system as defined in claim 8, wherein the indication of the received impression is stored in the training list when: the current ratio exceeds the threshold because a count of non-converted impressions causes the difference to exceed the threshold and the received impression includes an indication that the received impression resulted from a conversion.

10. The system as defined in claim 8, wherein the received impression includes an indication that the received impression resulted from a conversion associated with the segment when a previous advertisement associated with the segment was selected by a user associated with the received impression.

11. The system as defined in claim 8, wherein the trainer is to:
determine a user associated with the received impression;
determine a count of times that impressions associated with the user were previously utilized for training the classification model, and
discard the received impression in response to determining that the count exceeds a user threshold.

12. The system as defined in claim 8, wherein the trainer is to determine the segment by determining the segment based on prior online activity of a user computing device associated with the segment.

13. The system as defined in claim 8, wherein the trainer is to train or update the classification model in response to detecting that the training list meets a list threshold.

14. The system as defined in claim 13, wherein the trainer is to update the classification model utilizing impressions identified in the training list without utilizing previous impressions that were previously utilized for the updating of the classification model.

15. A non-transitory computer readable medium comprising instructions that, when executed, cause a machine to at least:
determine a segment associated with a received impression indicative of access to media on a webpage;
determine that the received impression includes an indication that the received impression is a converted impression that is associated with a conversion;
determine a current ratio of converted to non-converted impressions associated with a classification model associated with the segment;

determine a difference between the current ratio and a target ratio;

store an indication of the received impression in a training list of the classification model associated with the segment when: (a) the difference does not meet a threshold or (b) counting the received impression in the current ratio would reduce the difference by including an additional converted impression in training data for the classification model;

update the classification model using impressions identified in the training list to generate an updated classification model;

receive a subsequent media access associated with an impression;

generate, using the updated classification model, a score indicating whether the subsequent media access will result in a conversion;

add the impression associated with the subsequent media access to the training list based on the score indicating that the impression is associated with a conversion; and update the classification model using the impression added to the training list to generate an updated classification model.

16. The non-transitory computer readable medium as defined in claim 15, wherein the indication of the received impression is stored in the training list when: the current ratio exceeds the threshold because a count of non-converted impressions causes the difference to exceed the threshold and the received impression includes an indication that the received impression resulted from a conversion.

17. The non-transitory computer readable medium as defined in claim 15, wherein the received impression includes an indication that the received impression resulted from a conversion associated with the segment when a previous advertisement associated with the segment was selected by a user associated with the received impression.

18. The non-transitory computer readable medium as defined in claim 15, wherein the instructions, when executed, cause the machine to:
determine a user associated with the received impression;
determine a count of times that impressions associated with the user were previously utilized for training the classification model, and
discard the received impression in response to determining that the count exceeds a user threshold.

19. The non-transitory computer readable medium as defined in claim 15, wherein the instructions, when executed, cause the machine to determine the segment based on prior online activity of a user computing device associated with the segment.

20. The non-transitory computer readable medium as defined in claim 15, wherein the instructions, when executed, cause the machine to:
perform the updating in response to detecting that the training list meets a list threshold.

* * * * *